United States Patent Office 3,662,009
Patented May 9, 1972

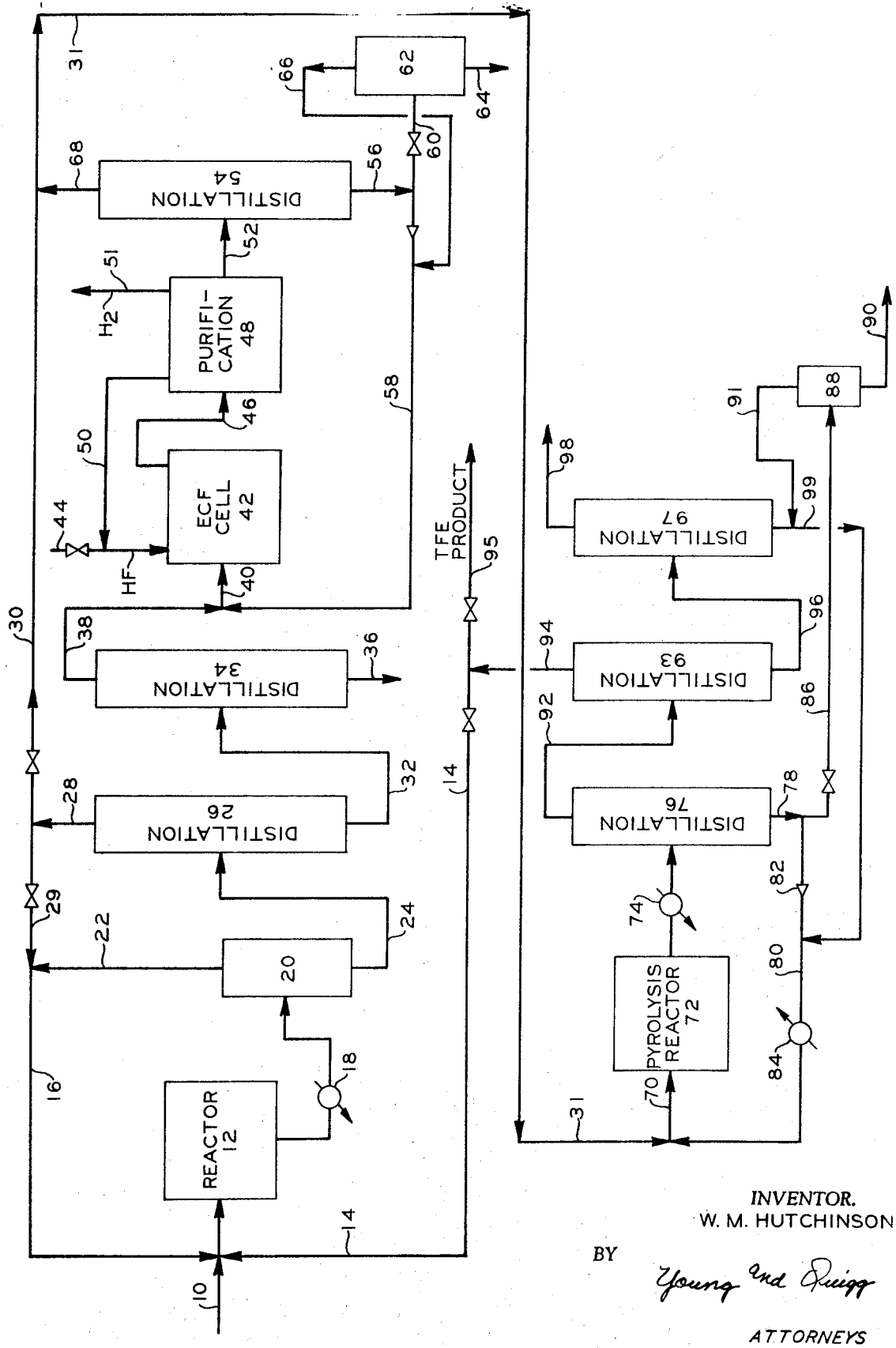

3,662,009
PREPARATION OF UNSATURATED
FLUOROCOMPOUNDS
William M. Hutchinson, Bartlesville, Okla., assignor to
Phillips Petroleum Company
Filed Nov. 24, 1969, Ser. No. 879,101
Int. Cl. C07c 21/18, 43/28
U.S. Cl. 260—653.3
9 Claims

ABSTRACT OF THE DISCLOSURE

Unsaturated fluorocompounds are produced by a combination of steps comprising (a) reacting a perhaloethylene with an unsaturated compound to produce a corresponding cyclobutane derivative, (b) fluorinating said cyclobutane derivative to obtain the corresponding perfluorocyclobutane derivative, (c) pyrolyzing said perfluorocyclobutane derivative to form the unsaturated perfluorocompound and said starting perhaloethylene, and (d) recycling at least a portion of said perhaloethylene formed in said step (c) to said step (a).

---

This invention relates to the preparation of unsaturated fluorocompounds. In one aspect this invention relates to the preparation of tetrafluoroethylene.

For convenience, tetrafluoroethylene will sometimes be referred to hereinafter as TFE. Tetrafluoroethylene is an unsaturated fluorocarbon having valuable utility in various applications. One particularly valuable utility is in the form of its various polymers, several of which have achieved commercial success. For example, the polymer or resin Teflon is widely used as a coating material in many applications where a coating material having release properties is desired, e.g., in the coating of cooking utensils. Teflon also has other well-known utilities. Tetrafluoroethylene would find even wider application if more efficient and economical methods of producing same were available. For example, tetrafluoroethylene cannot be prepared by the direct fluorination of ethylene because a saturated compound is obtained. With ethylene in economic and plentiful supply, it would be desirable to have a process for the production of tetrafluoroethylene from ethylene.

The present invention provides a solution to the above problems. The present invention provides a process for the preparation of tetrafluoroethylene or other unsaturated fluorocompounds from ethylene, other olefins, or other unsaturated compounds such as fluoroolefins, acetylene, or unsaturated ethers. Broadly speaking, the process of the present invention comprises an integrated unitary process which, considered as a whole, comprises a combination of four steps. Said four steps cooperate to produce the desired product, i.e., tetrafluoroethylene, by an efficient method not previously known.

An object of this invention is to provide an efficient process for the production of unsaturated fluorocompounds. Another object of this invention is to provide an efficient process for the production of tetrafluoroethylene from ethylene. Still another object of this invention is to provide an efficient process for the production of tetrafluoroethylene by an efficient combination of steps whereby tetrafluoroethylene itself is one of the starting reactants. Other aspects, objects, and advantages of the invention will be apparent to those skilled in the art in view of this disclosure.

Thus, according to the invention, there is provided a process for the production of an unsaturated fluorocompound, which process comprises, in combination, the steps of: (a) reacting a perhaloethylene having the formula $CF_2=CX_2$ with an unsaturated feedstock compound selected from the group consisting of $$CH_2=CY_2, \ CH\equiv CH, \ Z-CH=CY_2$$

and mixtures thereof, wherein each X is fluorine or chlorine, each Y is hydrogen or fluorine, and Z is $CY_3-$, $C_2Y_5-$, $CY_3O-$, or $C_2Y_5O-$, and wherein when said unsaturated feedstock compound is a $Z-CH=CY_2$ compound the perhaloethylene is tetrafluoroethylene, to produce a corresponding cyclobutane derivative having a formula selected from the group

wherein each Y, each X, and Z is as defined above; (b) fluorinating said cyclobutane derivative to form a perhalo compound having the formula

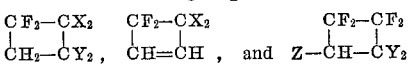

wherein each X is fluorine or chlorine; and $Z_f$ is $CF_3-$, $C_2F_5-$, $CF_3O-$, or $C_2F_5O-$; (c) pyrolyzing said perhalo compound formed in step (b) to form an unsaturated fluorocompound and said starting perhaloethylene of step (a); and (d) recovering said unsaturated fluorocompound product formed in step (c) and starting perhaloethylene formed in step (c) and recycling at least a portion of said recovered starting perhaloethylene formed in step (c) to said step (a).

Perhaloethylenes which can be used in step (a) of the combination of steps of the invention, include tetrafluoroethylene, chlorotrifluoroethylene, and dichlorodifluoroethylene. Unsaturated compounds which can be reacted with said perhaloethylene in said step (a) include ethylene, propylene, fluoroethylene, 1,1-difluoroethylene, acetylene, butene-1, methylvinyl ether, 2,2-difluoroethylvinyl ether, ethylvinyl ether, and the like, and mixtures thereof.

For purposes of convenience, and not by way of limitation, the invention will now be further described with particular reference to using tetrafluoroethylene and ethylene as the starting reactants in said step (a). Ethylene, being economically available in large quantities, is a preferred starting material. Tetrafluoroethylene, being the product of the process of the invention, is thus also readily available. It is an important feature of the present invention that it produces one of its own starting materials.

Step (a) in the combination of steps of the invention comprises cyclodimerizing a perhaloethylene, e.g., tetrafluoroethylene, with an unsaturated compound, e.g., ethylene, to form a corresponding cyclobutane derivative, e.g., 1,1,2,2-tetrafluorocyclobutane. Said cyclodimerization can be carried out at a temperature within the range of from 150 to 600, preferably 300 to 450, ° C. Generally speaking, fewer side reactions are involved when the operation is carried out within the preferred temperature range. Pressures within the range of from 0.5 atmosphere to 5000 p.s.i.g. can be employed. Pressures above atmospheric pressure are preferred. Fewer side reactions are obtained at the higher pressures. Said reactants are preferably reacted in a mol ratio of unsaturated compound to perhaloethylene within the range of from 0.3:1 to 50:1, more preferably within the range of from 5:1 to 20:1. These mixtures tend to be explosive and good temperature control is desirable. It is also preferred to carry out the reaction in small diameter tubular reactors. Turbulent flow conditions through the tubular reactors are preferred so as to promote heat transfer. It is sometimes desirable to dilute the reactants of step (a) with a perhalocyclobutane, produced in step (b) to moderate the reaction of step (a).

Step (b) in the combination of steps of the invention comprises fluorinating the cyclobutane derivative obtained in step (a), e.g., tetrafluorocyclobutane when tetrafluoroethylene and ethylene are the starting materials in said step (a), to obtain a perhalocyclobutane compound. Preferably, said fluorination is carried out electrochemically by the method of Fox and Ruehlen disclosed in copending application Ser. No. 683,085, filed Nov. 2, 1967, now U.S. Pat. 3,511,760, issued May 12, 1970. Briefly, said process comprises passing the feedstock to be fluorinated into the pores of a porous anode, e.g., porous carbon, disposed in a current-conducting, essentially anhydrous hydrogen fluoride electrolyte such as $KF \cdot 2HF$. Said feedstock contacts the fluorinating species within the pores of the anode and is therein at least partially fluorinated. Generally speaking, said fluorination can be carried out at temperatures within the range of from $-80$ to $500°$ C. at which the vapor pressure of the electrolyte is not excessive. A preferred temperature range is from about 60 to 105° C. Pressures substantially above or below atmospheric can be employed if desired. Generally speaking, the process is conveniently carried out at substantially atmospheric pressures. The feedstock to be fluorinated is preferably introduced into the pores of the anode at a rate such that there is established a pressure balance within the pores of the anode between the feedstock entering the pores and electrolyte attempting to enter said pores from another and opposing direction. Said feedstock flow rate can be within the range of from 3 to 600 milliliters per minute per square centimeter of anode cross-sectional area, taken perpendicular to the direction of flow and expressed in terms of gaseous volume calculated at standard conditions. Current densities employed can be within the range of 30 to 1000, preferably 50 to 500, milliamps per square centimeter of anode geometric surface area. Typical voltages employed can range from 4 to 12 volts. Converted and unconverted products are withdrawn from the pores of the anode and the products recovered from a cell effluent stream. Further details regarding said Fox and Ruehlen process can be found in said Pat. 3,511,760.

Said Fox and Ruehlen electrochemical fluorination process is the preferred fluorination process to be used in the practice of the invention. However, it is within the scope of the invention to employ other fluorination processes. For example, direct fluorination processes using elemental fluorine or indirect processes using cobalt trifluoride can be utilized.

Step (c) in the combination of steps of the invention comprises pyrolyzing the perhalocyclobutane derivative, e.g., octafluorocyclobutane, obtained in step (b), to obtain tetrafluoroethylene and the starting perhaloethylene of step (a). Generally speaking, said pyrolysis is preferably carried out at a temperature within the range of from about 1200 to about 1600° F. The conversion level can be maintained within the range of 0.1 to 60 percent; in most instances, preferably within the range of 0.5 to 50 percent. A conversion level of from about 8 to about 37 percent has been found to be practical. The pressures employed will preferably be substantially atmospheric, e.g., 0.05 to 5 atmospheres, it usually being preferred to operate at about 1 atmosphere pressure at the reactor outlet. It is within the scope of the invention to obtain effective pressures of less than 1 atmosphere by employing vacuum or diluting the octafluorocyclobutane feedstock, e.g., with an inert gas such as nitrogen, so as to lower the partial pressure of said octafluorocyclobutane. The contact time can vary over a relatively wide range of values within the range of 0.001 to 2 seconds, or longer, preferably from 0.01 to 1.5 seconds. Usually, the contact time will be within the range of 0.05 to 1 second. At any given conversion level and at any given reaction temperature level, there will be a contact time which should be employed. However, said contact time is not controlling in that it is fixed, depending upon the conversion level and temperature. In copending application Ser. No. 873,433, filed Nov. 3, 1969, in the names of Bjornson and Fox, there is disclosed a definite relationship between the conversion level and the temperature level which should be observed in order to achieve high selectivity to the production of tetrafluoroethylene in the pyrolysis reaction with substantially complete elimination of hexafluoropropene production. For example, at a given conversion level there is a reaction temperature which should not be exceeded. Stated conversely, when operating at a given reaction temperature, there is a maximum conversion level which should not be exceeded. This relationship can be expressed by the formula $$\text{conversion} \leqq 0.142t - 166$$

In the above formula, conversion of octafluorocyclobutane is expressed in percent, and $t$ is the reaction temperature in degrees F. Practically speaking, it is usually preferred to employ a tubular furnace, fix the temperature at a desired level, and then control the degree of conversion by varying the rate of flow of the reactant feedstock to said furnace.

Generally speaking, it is preferred that the pyrolysis reaction be carried out in tubular furnaces constructed of any suitable material. The various stainless steels, and particularly stainless steel—Type 304, have been found to be preferred materials of construction for the reaction tubes in the furnace. Inconel is another preferred material for the construction of the furnace reaction tubes. The furnace tubes are preferably constructed to have a large surface to volume ratio, e.g., as small a diameter as practical, so as to promote effective and uniform heat transfer at the generally preferred short contact time. Any suitable heating means can be employed for heating the reaction tubes.

Step (d) in the combination of steps of the invention comprises recycling to step (a) at least a portion of the starting perhaloethylene formed in pyrolysis step (c), e.g., tetrafluoroethylene when tetrafluoroethylene is said starting perhaloethylene. When tetrafluoroethylene is the starting perhaloethylene, the amount of said recycle will be that required to maintain the desired reactant ratio in step (a). When said starting perhaloethylene in step (a) is other than tetrafluoroethylene, all of the perhaloethylene formed in step (c) is usually recycled to step (a). In this instance, the amount of the other reactant in step (a) can be varied to maintain the desired ratio between said reactants. Optionally, make-up perhaloethylene can be added to step (a) as required.

The stream of perhaloethylene formed in step (c) and recycled, at least in part, from step (c) to step (a), is referred to herein as an "essential" recycle stream. It is this recycle step which makes the production of tetrafluoroethylene from ethylene and other similar feedstocks possible. As mentioned, the fluorination of ethylene or similar feedstocks directly results in the production of saturated compounds. Because ether linkages are quite stable under fluorination conditions, little or no losses are experienced by cleavage of the ethers. The cyclodimerization of the feedstock compound with the recycle perhaloethylene, e.g., tetrafluoroethylene, protects the double bond (actually the potential double bond of the tetrafluoroethylene product) from fluorination in step (b) and makes possible the production of tetrafluoroethylene where otherwise a saturated compound would be produced.

There is real and effective cooperation between each of the steps of the combination of steps of the invention. Step (a) produces the starting material for step (b), said step (b) produces the starting material for step (c), and step (c) provides one of the reactants for step (a). Thus, there is real and effective cooperation between the recycle step (d) in that it effectively links all the steps together and completes the combination of steps of the invention which provides the unique and efficient method of preparing unsaturated fluorocompounds such as tetrafluoroethylene from simple and easily available materials.

The drawing is a diagrammatic flow sheet illustrating several embodiments of the invention.

EXAMPLE I

Referring to said drawing, in one illustrative embodiment of the invention a stream of ethylene is introduced via conduit 10 into reactor 12. Said reactor 12 can be any suitable type of reactor. One presently preferred type of reactor comprises a tube and shell heat exchanger with the reactants being passed through nickel lined tubes, and a suitable heat exchange medium being passed on the shell side in concurrent flow with the reactants. A recycle stream of tetrafluoroethylene, obtained as described hereinafter, is introduced via conduit 14. Said reactor is operated at a temperature of about 430° C., a pressure of about 4 atmospheres, and a residence time of about 90 seconds. In said reactor 12, step (a) of the combination of steps of the invention is carried out to form 1,1,2,2-tetrafluorocyclobutane by the cyclodimerization of ethylene and tetrafluoroethylene, as the principal product. A small amount of octafluorocyclobutane is also formed by homodimerization of tetrafluoroethylene.

Effluent from reactor 12 is passed through cooler 18 and into separator 20 wherein a flash separation is effected to remove unreacted ethylene for recycle via conduits 22 and 16 to reactor 12. Reactor effluent, essentially ethylene free, is withdrawn from separator 20 via conduit 24 and passed into distillation column 26. A stream comprising the homodimer, octafluorocyclobutane, is withdrawn overhead from column 26 via conduit 28 and passed via conduits 30 and 31 to the pyrolysis step (c) described hereinafter. A stream comprising the codimer, tetrafluorocyclobutane, is withdrawn as bottom product from column 26 via conduit 32 and passed into distillation column 34. A small amount of heavy products is withdrawn from column 34 via conduit 36. Said codimer, tetrafluorocyclobutane, is withdrawn from column 34 as an overhead product via conduit 38 and passed via conduit 40 into electrochemical fluorination cell 42.

Said electrochemical fluorination cell 42 can comprise any suitable type of electrolytic cell having a porous carbon anode and a suitable cathode, e.g., a nickel screen, disposed in a KF·2HF electrolyte. If desired, the cell container can be the cathode. Make-up hydrogen fluoride is introduced into cell 42 via conduit 44. Feedstock from conduit 38, preferably together with a recycle of partially fluorinated feedstock in conduit 58, is introduced via conduit 40 into the pores of the porous carbon anode at the lower end portion thereof, travels upwardly through said anode within said pores and is withdrawn from the pores at the upper end portion of the anode. Within said pores, the fluorination feedstock contacts the fluorinating species and at least a portion thereof is fluorinated to octafluorocyclobutane. If desired, the cell can be divided into an anode compartment and a cathode compartment in known manner to keep the anode products and the cathode products separated. Or, if desired, said cell can be provided with capped anodes to keep the anode products and cathode products separated. However, in many instances, the anode products and cathode products can be withdrawn from the cell together. In the specific embodiment of the invention here illustrated, the electrochemical fluorination cell is operated at an average electrolyte temperature of about 106° C., a voltage of about 8 volts per cell, a current density of 186 amp./ft.$^2$ and at 0.588 Faraday per hydrogen equivalent per pass, to obtain about a 15 percent conversion of the total hydrogen in the tetrafluorocyclobutane-containing feedstock.

A cell effluent stream comprising octafluorocyclobutane is withdrawn from cell 42 via conduit 46 and passed into purification zone 48. Said purification zone 48 can be any suitable means for separating hydrogen fluoride and hydrogen from the cell effluent. For example, absorption towers filled with sodium fluoride in pelleted form can be used to absorb HF from the cell effluent stream. Two towers can be operated alternately, one on process and one on regeneration. Said towers will operate at about 100° C. on absorption, and can be regenerated on a desorption cycle at about 300° C. with a countercurrent flowing stream of hydrogen. The recovered hydrogen fluoride is recycled to cell 42 via conduit 50. Hydrogen removed from the cell effluent stream is withdrawn via conduit 51.

The purified cell effluent stream is withdrawn from purification zone 48 via conduit 52 and passed into distillation column 54. A bottom stream comprising partially fluorinated products from cell 42 is withdrawn via conduit 56 and recycled via conduit 58 to said cell 42 for further fluorination. A small bleed stream is withdrawn via conduit 60 to column 62 for removal of heavy ends from the recycle stream and thus keep said heavy ends from building up in concentration in said recycle stream. Said heavy ends are withdrawn from column 62 via conduit 64. The overhead from column 62 is returned via conduit 66 to the recycle stream in conduit 58.

The overhead stream from column 54 comprising octafluorocyclobutane is withdrawn via conduit 68 and passed via conduits 30, 31 and 70 into pyrolysis reactor 72 which can be any suitable type of reactor. Preferably, said pyrolysis reactor 72 is a tubular reactor with the reactant flowing through small diameter tubes which can be heated in any suitable manner, e.g., a liquid metal heat exchange medium, or by combustion of a fuel, etc. In the specific embodiment of the invention here illustrated, said pyrolysis reactor 72 is operated at a temperature of 1570° F., a conversion level of about 30 percent, and a contact time of 0.036 second.

Effluent from reactor 72 is passed through cooler 74 and into distillation column 76. A bottoms stream comprising unconverted octafluorocyclobutane and normal perfluorobutane is withdrawn from column 76 via conduit 78 for recycle via conduit 80, having check valve 82 therein, to reactor 72. Heater 84 is provided for heating said recycle stream. If desired, said heater 84 and cooler 74 can be combined in one heat exchanger. A small bleed stream is withdrawn from conduit 78 via conduit 86 and passed into column 88. The bottoms product withdrawn from column 88 via conduit 90 comprises crude normal perfluorobutane and also contains some perfluoroisobutylene. Overhead from column 88 is passed via conduits 91 and 99 into said recycle stream in conduit 80 to pyrolysis reactor 72.

The overhead stream from column 93 consists essentially of the product and recycle tetrafluoroethylene. A portion of said overhead is passed into conduit 14 for recycle to reactor 12 and the remainder is withdrawn via conduit 95 as product. The bottoms stream from column 93 comprises hexafluoropropene. Said bottoms product is passed via conduit 96 to column 97 for recovery of said hexafluoroprene as overhead therefrom via conduit 98. The bottoms product from said column 97 is recycled via conduits 99, 80 and 70 to pyrolysis reactor 72.

The principal stream quantities for the above-described specific illustrative embodiments of the invention are set forth in Table I.

TABLE I.—CONVERSION OF ETHYENE TO TETRAFLUOROETHYLENE

| Stream | 10 | 14 | 22 | 58 | 30 | 38 | 36 | 44 | 50 | 51 | 64 | 68 | 94 | 80 | 98 | 90 | 95 |
|---|---|---|---|---|---|---|---|---|---|---|---|---|---|---|---|---|---|
| | | | | | | | Mols per hour | | | | | | | | | | |
| $C_2H_4$ | 0.92 | | 10.0 | | | | | | | | | | | | | | |
| $C_2F_4$ | | [1]1.00 | 0.01 | | | | | | | | | 1.62 | | | | | 0.62 |
| $C_3F_6$ | | | | | | | | | | | | | | 0.02 | | | |
| $c$-$C_4H_4F_4$ | | | 0.3 | 0.5 | | 0.90 | | | | | | | | | | | |
| $c$-$C_4H_3F_5$ | | | | 1.3 | | | | | | | | | | | | | |
| $c$-$C_4H_2F_6$ | | | | 2.5 | | | | | | | | | | | | | |
| $c$-$C_4HF_7$ | | | | 10.0 | | | | | | | | | | | | | |
| $c$-$C_4F_8$ | | | 0.2 | | 0.04 | | | | | | | 0.78 | | 1.9 | | | |
| $n$-$C_4F_{10}$ | | | | 0.5 | | | | | | | | 0.02 | | 1.0 | | 0.02 | |
| HF | | | | | | | 3.7 | 2.5 | | | | | | | | | |
| $H_2$ | | | | | | | | | | | 3.7 | | | | | | |
| Heavies | | | | | | 0.20 | | | | | 0.1 | | | | | | |

[1] Includes about 0.1% of a free radical inhibitor, e.g., alpha-pinene, which is removed with heavy products via conduit 36.

While the above illustrative embodiment of the invention has been set forth in terms of starting with tetrafluoroethylene and ethylene as the reactants in step (a), the invention is not so limited. The following Table II summarizes other illustrative embodiments of the invention starting with other pairs of reactants in step (a), and continuing through the drawing substantially as described above in connection with Example I. Thus, the stream numbers in Table II, given below, refer to the streams in the drawing.

TABLE II

| | Example | | | |
|---|---|---|---|---|
| | II | III | IV | V |
| Principal reactants, intermediates, and products: | | | | |
| Process feedstock | $CH_2=CF_2$ | $CH\equiv CH$ | $CH_2=CH_2$ | $CH_3CH_2CH=CH_2$[a] |
| Recyclable perhaloethylene | $CF_2=CF_2$ | $CF_2=CF_2$ | $CF_2=CClF$ | $CF_2=CF_2$ |
| Cyclodimer | $H_2$-$F_2$ / $F_2$-$F_2$ | $F_2$-$F_2$ / H-H | $H_2$-$H_2$ / $F_2$-$FCl$ | $H$-$C_2H_5$-$H_2$ / $F_2$-$F_2$ |
| Fluorinated cyclodimer | $F_2$-$F_2$ / $F_2$-$F_2$ | $F_2$-$F_2$ / $F_2$-$F_2$ | $F_2$-$F_2$ / $F_2$-$FCl$ | $F$-$C_2F_5$-$F_2$ / $F_2$-$F_2$ |
| Pyrolysis products | $CF_2=CF_2$ | $CF_2=CF_2$ | $CF_2=CF_2$ / $CF_2=CFCl$ | $CF_3CF_2CF=CF_2$ / $CF_2=CF_2$ |
| Step (a), cyclodimer formation: | | | | |
| Temp., °C | 350 | 300 | 300 | 250 |
| Press., atm | 10 | 4 | 50 | 50 |
| Time, minutes | 20 | 166 | 12 | 6.6 |
| Stream 10, mols/hr | 0.82 $C_2H_2F_2$ | 0.41 $C_2H_2$ | 0.80 $C_2H_4$ | 1.0 n-$C_4H_8$ / 0.15 $C_2H_4$ |
| Stream 14, mols/hr.[b] | 1.0 $C_2F_4$ | 1.0 $C_2F_4$ | 1.0 $C_2ClF_3$ | 1.0 $C_2F_4$ |
| Stream 29, mols/hr | 0 | 5.0 c-$C_4F_8$ | 0 | 0 |
| Stream 22, mols/hr | 49 $C_2H_2F_2$ / 0.1 $C_2F_4$ / 0.5 c-$C_4F_8$ / 0.1 c-$C_4H_2F_6$ / 0.1 c-$C_4F_8$ | 3.0 $C_2H_2$ / 0.1 $C_2F_4$ / 7.0 c-$C_4F_8$ | 10 $C_2H_4$ / 0.1 $C_2ClF_3$ | 1.0 $C_2H_4$ / 0.1 $C_2F_4$ / 0.2 cy-$C_4F_8$ |
| Stream 30, mols/hr | | 0.3 c-$C_4F_8$ | 0.1 c-$C_4Cl_2F_6$ | 0.10 cy-$C_4F_8$ / 0.3 n-$C_4H_8$[c] |
| Step (b), electrochemical fluorination: | | | | |
| Temp., °C | 105 | 98 | 95 | 100 |
| Faradays/H equiv./pass | 0.7 | 0.5 | 0.6 | 0.5 |
| Stream 38, mols/hr | 0.80 c-$C_4H_4F_6$ | 0.4 c-$C_4H_2F_4$ | 0.8 c-$C_4H_4ClF_3$[d] | 0.15 cy-$C_4H_4F_4$ / 0.65 cy-$C_6H_8F_4$ |
| Stream 68, mols/hr | 0.74 c-$C_4F_8$ / 0.01 n-$C_4F_{10}$ | 0.38 c-$C_4F_8$ | 0.15 c-$C_4F_8$ / 0.40 c-$C_4ClF_7$ / 0.20 c-$C_4Cl_2F_6$ | 0.15 c-$C_4F_8$ / 0.54 c-$C_6F_{12}$ |
| Stream 64, mols/hr | 0.05 | 0.02 | 0.05 | 0.11 |
| Step (c), pyrolysis: | | | | |
| Temp., °C | 820 | 820 | 750 | 800 |
| Press., atm | 1 | 1 | 1 | 1 |
| Time, sec | 0.05 | 0.05 | 0.05 | 0.03 |
| Conversion, percent | 30 | 30 | 10 | 20 |
| Stream 94, mols/hr | 1.66 $C_2F_4$ | 1.34 $C_2F_4$ | 0.70 $C_2F_4$ | 1.0 $C_2F_4$ |
| Stream 95, mols/hr | 0.66 $C_2F_4$ | 0.34 $C_2F_4$ | 0.70 $C_2F_4$ | 0 |
| Stream 98, mols/hr | 0.02 $C_3F_6$ | 0.02 $C_3F_6$ | 1.00 $C_2ClF_3$[f] | <0.01 $C_2F_6$ |
| Stream 90, mols/hr | 0.01 n-$C_4F_{10}$ | 0 | 0 | 0.50 n-$C_4F_8$ |

[a] Feed contains 0.15 mol $C_2H_4$/mol $C_4H_8$.
[b] Includes about 0.1% of a free radical inhibitor, e.g., alpha pinene, which is removed with heavy products via conduit 36.
[c] Removed with $H_2SO_4$ wash before pyrolysis in step (c).
[d] 0.05 $Cl_2$ is added prior to fluorination to maintain level of recycle $CF_2=CClF$.
[e] Product of process.
[f] Is recycled to step (a) via conduit 14.

The above-described specific illustrative embodiments of the invention, and the data given in Tables I and II, demonstrate the real and effective cooperation between the steps in the combination of steps of the invention.

An outstanding advantage of the process of the invention afforded by said cooperation is the purity of the product unsaturated fluorocompound, e.g., tetrafluoroethylene. This increased purity is possible in the process of the invention because essentially no hydrogen-containing species or materials are introduced into the pyrolysis reactor in step (c), and hence no hydrogen-containing species or materials can appear in said product. Such species or materials are a source of considerable difficulty in conventional prior art processes because they act as polymerization chain transfer agents and lower the molecular weight of the polymer when said product is utilized in polymerization processes. The only impurities present in the tetrafluoroethylene product of the invention are small amounts of perfluoropropene and perfluorocyclobutane. These can be reduced to less than 100 parts per million by weight by conventional distillation.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. A process for the production of an unsaturated fluorocompound, which process comprises, in combination, the steps of:
    (a) reacting, at a temperature within the range of from about 150 to about 600° C., a perhaloethylene having the formula $CF_2=CX_2$ with an unsaturated feedstock compound selected from the group consisting of $CH_2=CY_2$, $CH\equiv CH$, and $Z-CH=CY_2$ and mixtures thereof, wherein each X is fluorine, each Y is hydrogen or fluorine, and Z is $CY_3-$, $C_2Y_5-$, $CY_3O-$, or $C_2Y_5O-$, and wherein when said unsaturated feedstock compound is a $Z-CH=CY_2$ compound the perhaloethylene is tetrafluoroethylene, to produce a corresponding cyclobutane derivative having a formula selected from the group

wherein each Y, each X, and Z is as defined above;
    (b) electrochemically fluorinating said cyclobutane derivative to form a perhalo compound having the formula

wherein each X is fluorine or chlorine, and $Z_f$ is $CF_3-$, $C_2F_5-$, $CF_3O-$, or $C_2F_5O-$;
    (c) pyrolyzing, at a temperature within the range of from about 1200 to about 1600° F., said perhalo compound formed in step (b) to form an unsaturated fluorocompound having the formula $CF_2=CF_2$ or $Z_f-CF=CF_2$ and said starting perhaloethylene $CF_2=CX_2$ of step (a); and
    (d) recovering said unsaturated fluorocompound product formed in step (c) and starting perhaloethylene formed in step (c) and recycling at least a portion of said recovered starting perhaloethylene formed in step (c) to said step (a).

2. A process according to claim 1 wherein said perhaloethylene is tetrafluoroethylene.

3. A process according to claim 1 wherein said unsaturated feedstock compound is ethylene.

4. A process according to claim 2 wherein said unsaturated feedstock compound is 1,1-difluoroethylene.

5. A process according to claim 2 wherein said unsaturated feedstock compound is acetylene.

6. A process according to claim 2 wherein said unsaturated feedstock compound is butene-1.

7. A process according to claim 3 wherein said perhaloethylene is 1,1,2-trifluoro-2-chloroethylene.

8. A process for the production of tetrafluoroethylene, which process comprises, in combination, the steps of:
    (a) reacting, at a temperature within the range of about 150 to about 600° C., tetrafluoroethylene with ethylene to produce 1,1,2,2-tetrafluorocyclobutane;
    (b) electrochemically fluorinating 1,1,2,2-tetrafluorocyclobutane from step (a) to produce octafluorocyclobutane;
    (c) pyrolyzing, at a temperature within the range of from about 1200 to about 1600° F., octafluorocyclobutane from step (b) to produce tetrafluoroethylene; and
    (d) recovering said tetrafluoroethylene from step (c) as product of the process and recycling a portion thereof to said step (a).

9. A process according to claim 8 wherein in step (d) said recovered perhaloethylene recycled to step (a) is a major portion of the perhaloethylene reactant used in said step (a).

References Cited

UNITED STATES PATENTS

| | | | |
|---|---|---|---|
| 2,462,345 | 2/1949 | Barrick | 260—648 F |
| 2,733,278 | 1/1965 | Anderson | 260—653.3 |
| 3,306,940 | 2/1967 | Halliwell | 260—653.3 |

OTHER REFERENCES

Hudlicky: The Chemistry of Organic Fluorine Compounds, pp. 130, 131, 257 and 274 (1962).

DANIEL D. HORWITZ, Primary Examiner

U.S. Cl. X.R.

260—611 R, 614 F, 648 F

UNITED STATES PATENT OFFICE

CERTIFICATE OF CORRECTION

Patent No. 3,662,009                      Dated: May 9, 1972

William M. Hutchinson

It is certified that error appears in the above-identified patent and that said Letters Patent are hereby corrected as shown below:

Columns 9 and 10, top of page, patent number "2,662,009" should read — 3,662,009 —; column 9, line 39, after "fluorine" insert — or chlorine —.

Signed and sealed this 5th day of September 1972.

(SEAL)
Attest:

EDWARD M. FLETCHER, JR.                        ROBERT GOTTSCHALK
Attesting Officer                                 Commissioner of Patents